US010726024B2

(12) United States Patent
Batra

(10) Patent No.: US 10,726,024 B2
(45) Date of Patent: *Jul. 28, 2020

(54) SEARCH OF NAS DATA THROUGH ASSOCIATION OF ERRORS

(71) Applicant: Western Digital Technologies, Inc., San Jose, CA (US)

(72) Inventor: Rajesh Batra, Los Altos, CA (US)

(73) Assignee: Western Digital Technologies, Inc., San Jose, CA (US)

(*) Notice: Subject to any disclaimer, the term of this patent is extended or adjusted under 35 U.S.C. 154(b) by 315 days.

This patent is subject to a terminal disclaimer.

(21) Appl. No.: 15/855,751

(22) Filed: Dec. 27, 2017

(65) Prior Publication Data

US 2018/0121437 A1   May 3, 2018

Related U.S. Application Data

(63) Continuation of application No. 14/099,863, filed on Dec. 6, 2013, now Pat. No. 9,864,781.

(60) Provisional application No. 61/900,259, filed on Nov. 5, 2013.

(51) Int. Cl.
*G06F 17/00* (2019.01)
*G06F 16/2457* (2019.01)

(52) U.S. Cl.
CPC .............. *G06F 16/24578* (2019.01)

(58) Field of Classification Search
CPC .............. G06F 16/24578; G06F 17/3053
See application file for complete search history.

(56) References Cited

U.S. PATENT DOCUMENTS 9,037,598 B1 * 5/2015 Morton .............. G06F 16/2477
707/767
2006/0200442 A1 * 9/2006 Parikh ................ G06F 16/9024
2014/0358906 A1 * 12/2014 Behzadi ............ G06F 16/24578
707/723

OTHER PUBLICATIONS

Yoganarasimhan, Hema. "Search Personalization using Machine Learning". (Year: 2017).*
Carlsen, F. "Personalized Search". (Year: 2015).*

* cited by examiner

*Primary Examiner* — Syed H Hasan
(74) *Attorney, Agent, or Firm* — Chang & Hale LLP

(57) ABSTRACT

A computer-perceptible search input, whether typed, spoken, based upon machine vision, detection and/or interpretation of gestures, for example, may be received by a computing device from a single user. The received input by the single user may be matched with one or more stored digital items based upon prior inputs by the single user that previously led the single user to access the digital item(s). That is, it may be determined whether the received input is the same or similar to a previous input or inputs that led the computing device to search for, select and present digital items that were subsequently accessed (e.g., opened) by the user, which action signifies a successful search.

21 Claims, 4 Drawing Sheets

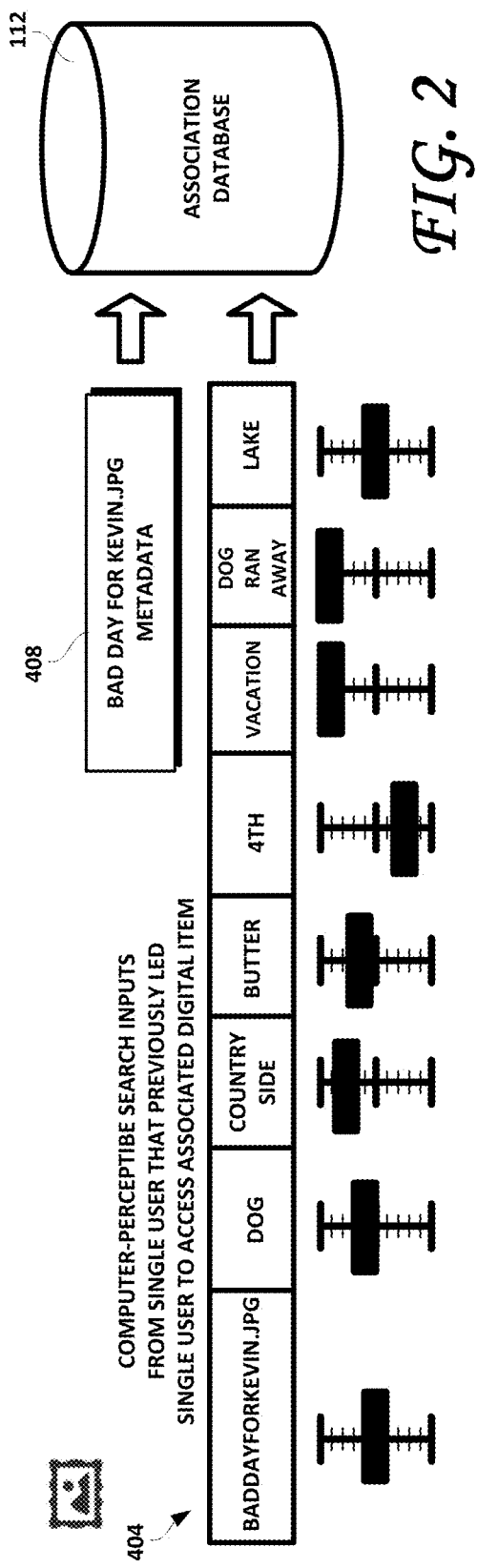
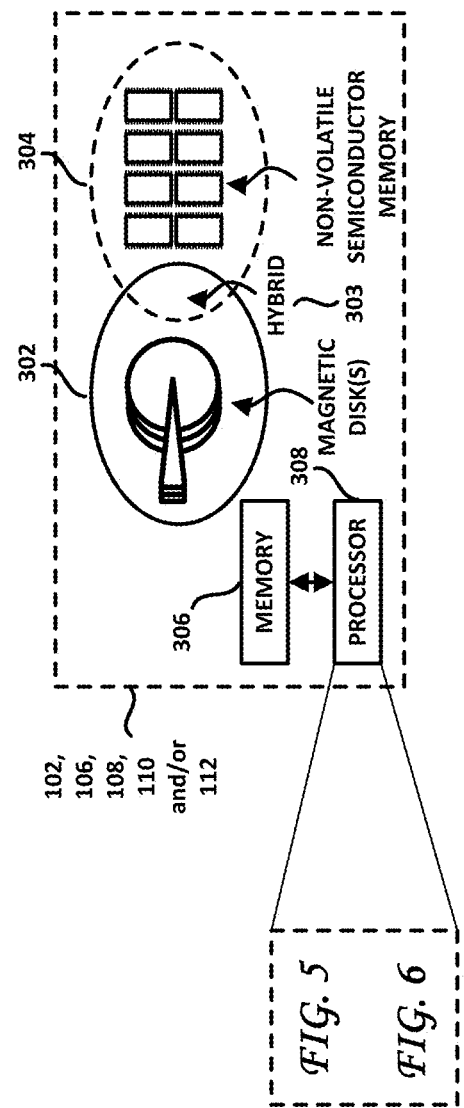

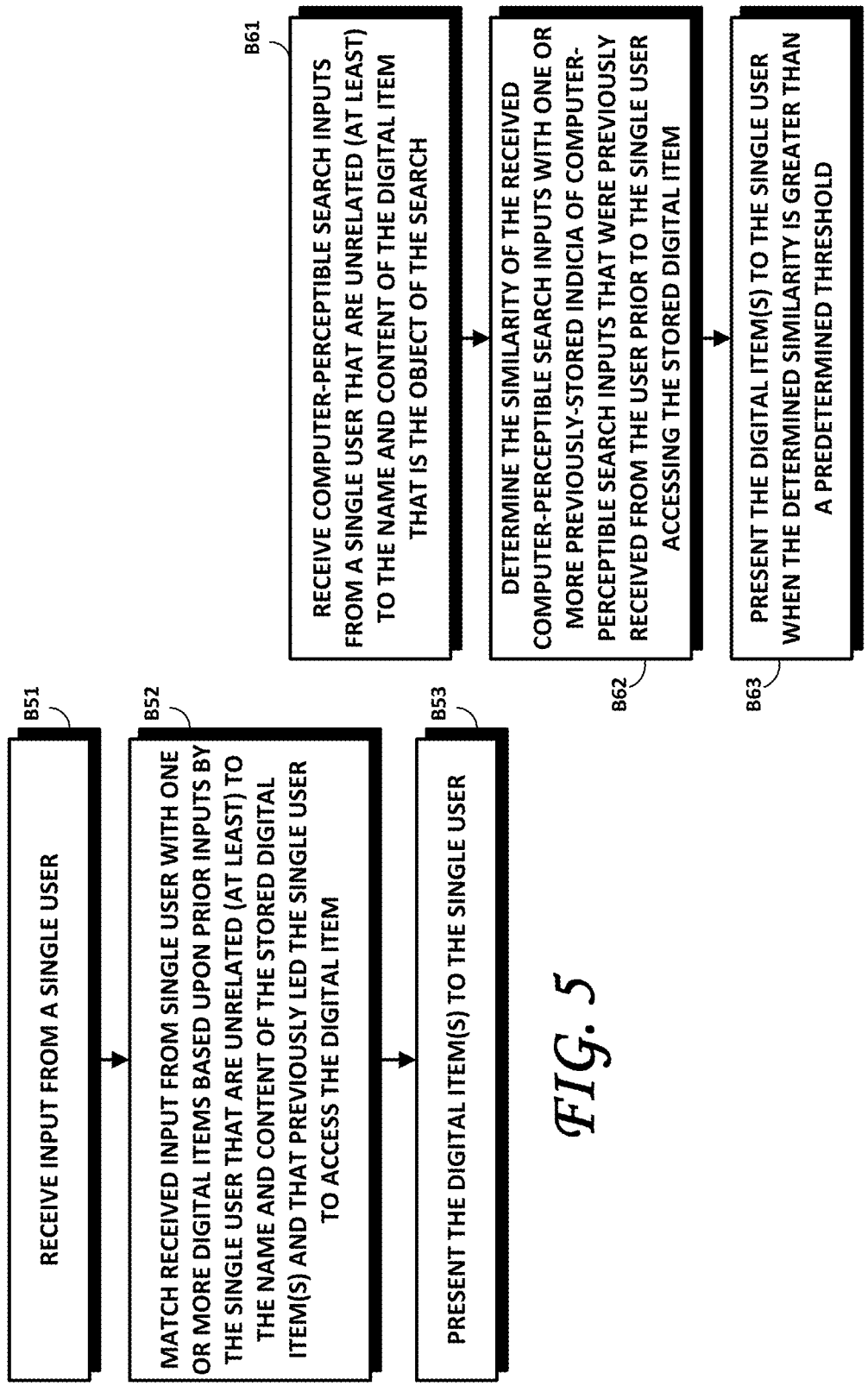

SEARCH OF NAS DATA THROUGH ASSOCIATION OF ERRORS

CROSS-REFERENCE TO RELATED APPLICATIONS

The present application is a continuation of U.S. patent application Ser. No. 14/099,863 (issued as U.S. Pat. No. 9,864,781) filed on Dec. 6, 2013, entitled "SEARCH OF NAS DATA THROUGH ASSOCIATION OF ERRORS," which claims priority to U.S. Provisional Patent Application Ser. No. 61/900,259 entitled "IMPROVED SEARCH OF NAS DATA THROUGH ASSOCIATION OF ERRORS," filed Nov. 5, 2013, the disclosures of which are hereby incorporated by reference in their entireties.

BACKGROUND

Searches may be carried out via the filename or by searching via keywords in the metadata or within the file itself. Google®, for example, leverages its massive databases of search terms gathered from billions of searches by countless individuals to return a probable match.

BRIEF DESCRIPTION OF THE DRAWINGS

FIG. 2 illustrates populating an association database with indicia of computer-perceptible search inputs and weights associated with the stored indicia, according to one embodiment.

FIG. 3 is a block diagram illustrating aspects of a computing device and/or storage server such as a Network Attached Storage (NAS), according to one embodiment.

FIG. 5 is a flowchart of a method according to one embodiment.

FIG. 6 is a flowchart of a method according to one embodiment.

DETAILED DESCRIPTION

Figure 1:
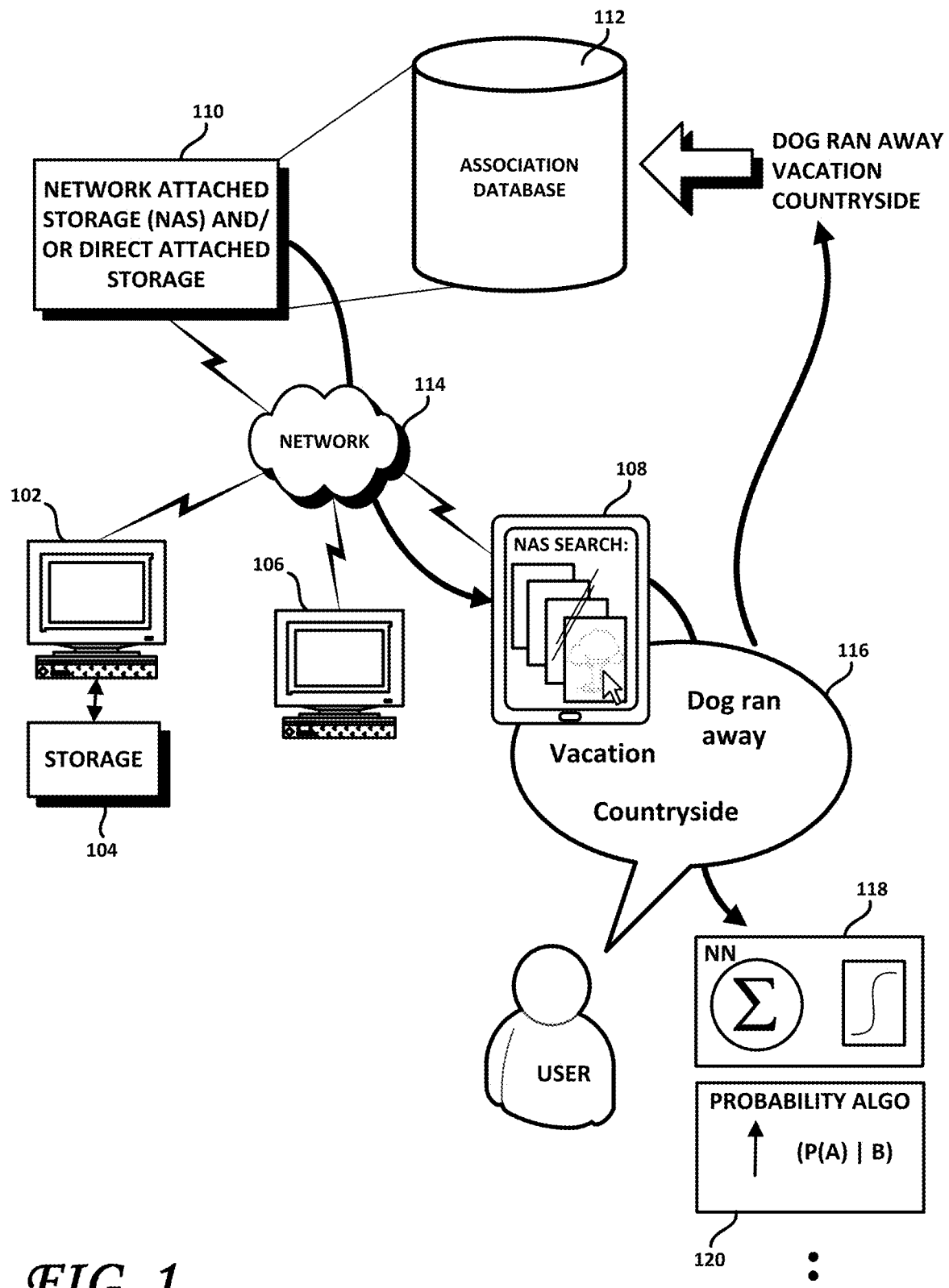
FIG. 1 is a block diagram of one embodiment.

While keyword searching is widespread, there is no comparable technology in the personal user data space that leverages user errors. For example, there is no good and efficient way to search one's network attached storage (NAS) device for a specific file, picture, piece of music, movie clip, etc. that uses errors in previous search terms by the user to generate better search results.

An embodiment comprises improved searching of data (such as personal stored on the user's NAS or direct attached storage (DAS) or such as other content accessible over the Internet) that is enabled through an association of search keywords, including errors or user free associations, with the stored files. In trying to find items, humans make errors or pursue unpredictable paths based upon their personality, life experiences and prior experience in finding the same or similar items. According to one embodiment, by using such "errors" (including seemingly wholly unrelated search terms), a more efficient and highly personal search is made possible.

One embodiment comprises searching for stored digital items through the receipt and processing of computer-perceptible user input. Such digital items may comprise files of any kind, digital data objects, documents, stored pictures, videos and/or audio content. According to one embodiment, the phrase "computer-perceptible user input" encompasses all user input that is in any way detectable, interpretable, or otherwise perceptible to a computing device, such as text input, voice input, gestural input or input through machine vision, for example.

One embodiment comprises searching the user's NAS or other network-accessible storage (or local storage) for stored digital items based upon the user's past search terms or any other computer-perceptible user input received by a computing device to initiate or refine a search for that or similar digital items. The result may be personal to that user, in that other users searching their NAS or other storage with the same search terms or other forms of user input may not be presented with the same search results.

One embodiment associates the user's keywords, errors and any other personal association with the digital item or items retrieved or otherwise accessed as a result of those keywords, errors and/or personal associations. For example, when searching for stored architectural plans, the user might use the search terms "architecture, plans, house, fishing pond" in an effort to find the architectural plans for a guest house. In this context, the search terms "Architecture", "plans" and "house" are readily understandable by most users as search terms likely to cause the retrieval of architectural plans. Such keywords may be considered to be impersonal, in that they represent search terms that any individual is more likely than not to input to cause the retrieval of architectural plans. Such likely search terms may have been previously determined over many searches by many individuals and may, in the aggregate, represent a relatively high statistical likelihood of not only being the search terms a generic user is likely to enter, but search terms that are likely to retrieve content that is directly associated with the search terms "architecture", "plans" and "house".

The phase "fishing pond", on the other hand, is not immediately or intuitively associated with architectural plans. Such a seemingly-unrelated association, according to one embodiment, may nevertheless be used to good advantage to cause the computing device to search and present the desired digital item—in this case, the sought-after architectural plans. The search terms "fishing pond", in this example, may not make sense to anyone other than the user. However, in that user's mind, the term "fishing pond" may have a direct association with the architectural plans he or she is seeking. For example, the remodeled guest house that is the subject of the architectural plans may look out over the fishing pond, which is the first thing this particular single user thinks of when thinking of the remodeled guest house. However, other users would be unlikely to form the same association and/or cause a similarly constituted computing device to retrieve the same digital item when presented with the same search terms. That is because such other user or users may not have formed the same association of "fishing pond" with the architectural plans being sought—and have previously used such search terms in conjunction with a prior search for the architectural plans. These associations may be intentional or wholly unintentional. Herein, such unintentional associations may be called "errors". For example, had the user previously entered "vacuum cleaner" instead of "fishing pond" when previously searching for the architectural plans, the phrase "vacuum cleaner" would, according to one embodiment, become associated with the sought architectural plans such that, upon a subsequent search, entering the phrase "vacuum cleaner" would be likely to increase the likelihood that the architectural plans in question would be retrieved or at least presented to the user. Subsequent uses of such search terms or other forms of input may strengthen the association between the object of the search and the entered search term or received other forms of input. Indeed, according to one embodiment, subsequent successful searches using such a personal association (i.e., searches using "vacuum cleaner" in which the architectural plans were retrieved by the computing device and accessed by the user) tend to reinforce the association between the architectural plans and the search terms, including "vacuum cleaner". Such reinforcement may take the form of, for example, a weight, a coefficient or any other physical, mathematical or logical device that operates to quantify a variable degree of association between any particular user input and the digital item (e.g., file) being sought.

According to one embodiment, when a digital item such as a file is retrieved as a result of a search based on keywords, errors or other associations, a probability or weight may be increased. In this manner, the association between, say, "fishing pond" or "vacuum cleaner" and the architectural drawing file may be strengthened such that the file is more likely to be returned the next time the user uses that or those search terms, keywords, errors and/or associations. According to one embodiment, therefore, no distinction need be made between words, phrases or any other computer-perceptible user input that are semantically-related to the digital item being sought (i.e., "architecture" is semantically related to architectural drawings) and words, phrases or any other computer-perceptible user input that are not (or that would not be to the general public) semantically-related to the digital item being sought (i.e., "vacuum cleaner" is not semantically related to architectural drawings, at least to the general public). According to one embodiment, computer-perceptible user input(s) that are received by the computing device that performs the search may be associated, in the mind of the user, to the digital item(s) that is or are the subject of the search. According to one embodiment, indicia of such computer-perceptible user input may be stored and assigned a weight. Upon a subsequent search, should the user again use such seemingly unrelated (except to him or her) terms or phrases as search terms, and access the same presented digital item, the association therebetween may be strengthened by, for example, increasing a weight assigned to the stored indicia of such computer-perceptible user input. Over time, therefore, the likelihood of the user retrieving specific digital items based upon his or her unique associations will be correspondingly increased, although a casual, fly-on-the-wall observer may not understand why "vacuum cleaner" causes the computing device to present architectural plans to the user.

FIG. 1 is a block diagram of one embodiment. As shown therein, a network 114 may couple a computing device comprising a NAS 110 or other Direct Access Storage (DAS) with one or more computing devices 102, 106, 108 (e.g., smart phone, tablet, laptop, desktop, smart TV, media player, etc.) that may be configured to access the computing device 110 over the network 114. In particular, one or more of the computing devices 102, 106 and 108 may be configured to carry out searches of the digital items stored or otherwise accessible to the NAS (or other computing device) 110. One or more of the computing device 102, 106 and 108 may comprise local storage, as shown at 104. As shown in the example of FIG. 1, a user may enter, say or otherwise provide the computing device 108 with computer-perceptible user input "dog ran away", "vacation" and "countryside". While one may infer (rightly or wrongly), from the search terms "vacation" and "countryside", that the user is searching for previously-stored content related to a prior vacation in the country, the search terms "dog ran away" may only be personally evocative of predetermined content for that particular user, or perhaps his or her family. According to one embodiment, if the search terms "dog ran away", "vacation" and "countryside" cause the computing device 110 to retrieve and present a desired digital item (e.g., a movie or a photo) and the user accesses (e.g., opens) the presented digital item(s), then the weight or association of these search terms, including the seemingly-unrelated "dog ran away" phrase will be strengthened, such that subsequent searches using "dog ran away" as search terms will be more likely to find and present to the user the previously found and accessed digital item. As such, the searches may become highly personal, as "fishing pond" and "architectural drawings", at first blush, bear no association to one another as developed in the previous example—except for the person to whom such association makes perfect sense. In this regard, there may be no "errors" per se.

According to one embodiment, a probabilistic learning algorithm may be employed by the NAS 110 (e.g., computing device or storage server) to "train" the computing device to return the desired search results. Such a probabilistic learning algorithm, represented in FIG. 1 at 120, may comprise, for example, an implementation of Bayes' theorem: $P(A|B)=[P(B|A)P(A)]/P(B)$, which quantifies the probability of a file (or other digital item) A being found as a result of computer-perceptible user input B being entered as search term(s). The result is a number that represents the probability of finding the file A in the user's NAS or other storage given the computer-perceptible user input (keywords, "errors", highly personal search terms, and the like) B entered.

According to one embodiment, the NAS 110 may also employ an implementation of neural networks (NN) as shown at 118 or similar learning functionality using, for example, a threshold function or a smooth non-linear activation function, together with weights that are adjusted upwards when a search is successful and downwards when the search terms, associations do not result in the user retrieving or otherwise accessing the desired document or digital item.

FIG. 2 illustrates populating an association database with indicia of computer-perceptible search inputs and weights associated with the stored indicia, according to one embodiment. In some embodiments, the association database may comprise a relational database, key/value pairings, flat file, XML file, and/or other data repository. The association database 112 may, as shown in FIG. 1, be stored within the NAS 110. Alternatively, the association database may be stored remotely therefrom, such as in the local storage 104 coupled to computing device 104, for example. According to one embodiment, the association database 112 may be configured to be accessible over the network 114 and/or may be distributed across several devices. As shown, the association database or index file 112 may be configured, according to one embodiment, to store metadata 408 embedded or otherwise associated with the digital item. In this example, the digital item is a digital picture, baddayforkevin.jpg. The association database 112 may store, according to one embodiment, computer-perceptible search inputs from a single user that previously led that single user to access (e.g., open) the associated digital item. For instance, that single user may have previously have entered search inputs "dog", "countryside", "$4^{th}$", "vacation" and "lake". If baddayforkevin is a picture of, for example, the user's child Kevin struggling to learn how to swim during a vacation at Lake Tahoe on the 4$^{th}$ of July, such search terms are readily semantically or at least thematically-related to the name and/or contents of the picture or to the information with which this digital item was tagged. These search terms may be stored in the association database 112. Also, other computer-perceptible search inputs may be stored in the association database 112 such as "butter", "dog" and "dog ran away", which seemingly bear no readily apparent relation to the baddayforkevin JPG digital picture. Moreover, such search terms may be wholly unrelated to the original metadata associated with the baddayforkevin.JPG digital picture. For example, unrelated search terms can include search terms that do not match the name of a file, are not found in the contents of the file, and/or are not found in the original metadata of the file. However, such seemingly-unrelated associations may have been made by the specific user on previous accesses of this digital item. For example, the user may remember that there was no butter for his morning toast that day, and that the family dog ran away the afternoon of the day Kevin was learning to swim. Those aspects may be the most memorable, in the user's mind, of the associations the user may have made with this particular picture. Advantageously, as the system, in one embodiment, does not need to rely on the contents of files to generate associations, the system can generate matches for files whose contents are not ordinarily text-searchable, such as picture files, audio files, movie files or encrypted files. As shown, previous entries of the computer perceptible search inputs "butter" and "dog ran away" during a prior search may have caused the computing device to present the digital item baddayforkevin.jpg to the user, which the user subsequently opened as that picture was indeed the object of his or her search.

Figure 4:
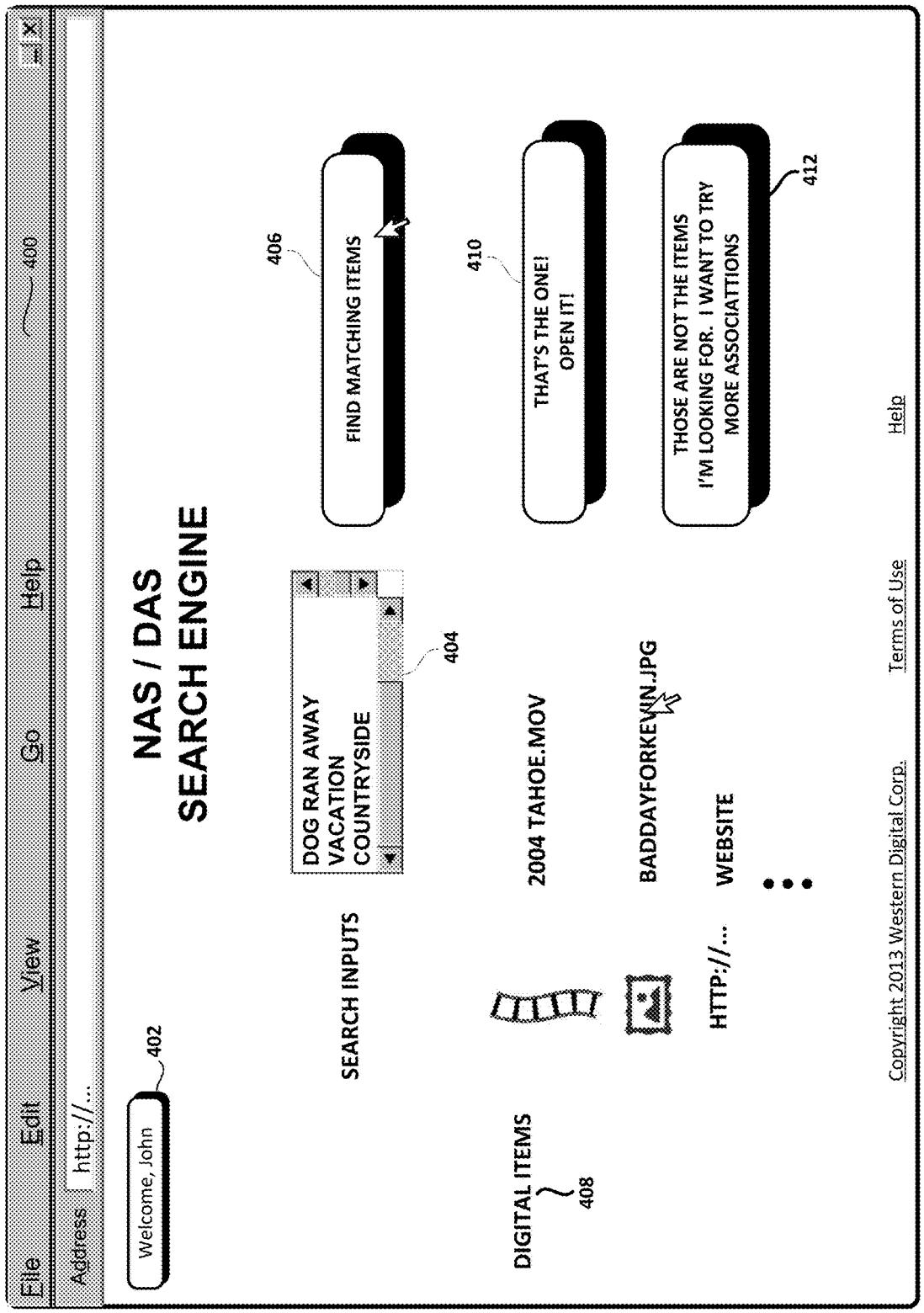
FIG. 4 shows an exemplary user interface that illustrates aspects of one embodiment.

This accessing of the presented digital item, according to one embodiment, operates to strengthen the association between "butter" and "dog ran away" and the picture of Kevin swimming. One way to strengthen this association is to increase the value of coefficients or weights associated with each of the computer-perceptible search inputs. In this manner, as shown in FIG. 3, the weights associated with "butter", "vacation" and "dog ran away" may be increased, which increases the likelihood that the search engine in the NAS or other implementing computing device will subsequently return this digital item when next presented with similar or the same FIG. 4 shows an exemplary user interface that illustrates aspects of one embodiment. Weights or other coefficients representative of an association of search terms or other forms of computer-perceptible inputs may be weakened or otherwise decreased through non-use. That is, the weights associated with those search terms that have not been used or not used successfully, may be decreased and/or replaced with other associations as the search engine refines its search methodologies for this particular user.

According to one embodiment, therefore, the search becomes more efficient the longer the user uses it, as probabilities are increased or decreased and/or as weights and/or associations are changed depending upon the success or failure of prior searches. To do so, the association database 112 or index file may be consulted during searches, to carry out and/or refine the search by matching or determining the similarity between the computer-perceptible user inputs and the indicia of associations, metadata and/or other search terms stored therein.

FIG. 3 is a block diagram of a computing device 102, 106, 108, 110 or 112 according to one embodiment. The computing device may comprise tangible, non-transitory storage comprising, for example, rotary media storage comprising magnetic disks 302, non-volatile semiconductor memory 304, or a hybrid thereof 303, comprising both magnetic disks 302 and non-volatile semiconductor memory 304. The computing device may also comprise volatile memory 306 and a processor (controller, microprocessor) 308. The processor 308 may be coupled to the memory 306, as well to the non-volatile memory or memories 302, 303 and 304. According to one embodiment, the processor 308 may be configured to execute sequences of instructions configured to carry out the methods of FIGS. 5 and 6, discussed hereunder.

FIG. 4 shows an exemplary user interface that illustrates aspects of one embodiment. The exemplary user interface 400 may be configured as a browser or as a mobile app, among other possibilities. As shown, the user may log in and become authenticated by the application, as shown at 402. In this manner, the user's (John's) previous search history (including search terms, keywords, associations and other forms of computer-perceptible search inputs) may be accessed and used to present the most relevant search results to this single user (John). Other users may be associated with their own instance of the association database 112 and may have made and caused to be stored therein entirely different associations for the same stored content. In a search bar 404, the user may enter his computer-perceptible search inputs. In this exemplary case, the user John has entered "dog ran away", "vacation" and "countryside", as these are John's most memorable associations with the digital picture (baddayforkevin.jpg) for which he is searching. At 408, the NAS 110 or other computing device returns with a movie called 2004 Tahoe.mov, the file baddayforkevin.jpg and one or more websites or deep links to a document accessible at a website. As shown, one embodiment may return search results not only from the user's own NAS or other network-accessible or local storage, but also from other website and other Wide Area Network (WAN) accessible content. With the proper permissions, another user's NAS or network-accessible storage may be searched and the results thereof presented to the user, as shown at 408. At reference numeral 410, the user may be presented with the opportunity to select and open one of the presented digital items or to attempt to refine his or her search (or start over), as suggested at 412. Other user interface implementations are possible.

FIG. 5 is a flowchart of a method according to one embodiment. As shown therein, block B51 calls for receiving an input from a single user. The input may, according to one embodiment be any computer-perceptible search inputs be it typed, spoken, based upon machine vision, detection and interpretation of gestures and the like. At B52, the received input by the single user may be matched, through access to an association database, for example, with one or more stored digital items based upon prior inputs by the single user that previously led the single user to access the digital item(s). That is, it may be determined whether the received input is the same or similar to previous inputs that led the computing device to search for, select and present digital items that were subsequently accessed (e.g., opened) by the user, which action may be associated with a successful search. At B53, the digital item(s) selected as a result of the search may be presented the single user. According to one embodiment, the digital item(s) may be stored, for example, in one or more NAS, DAS or other forms of network-accessible storage. As detailed above, the input from the single user received in B51 in FIG. 5 may comprise search terms that are personal to that single user and/or may be or include search terms that are unrepresented by the name of the digital item or by the content thereof. The input from the single user received in B51 in FIG. 5 may also comprise search terms that are unrepresented by the original metadata of the stored digital item.

According to one embodiment, one or more of the search terms or computer-perceptible search inputs may be or comprise a search term or computer-perceptible search input that was previously entered but subsequently deleted prior to submission. That is, a user may have entered one or more search terms or have submitted some other computer-perceptible search inputs in a prior search for the same content, but subsequently changed his or her mind and deleted the search terms or have submitted some other computer-perceptible search inputs prior to submitting the same to the search engine to initiate or refine the search. Such inputs may provide contextual cues of the content for which the user is searching. Accordingly, even though such search terms or computer-perceptible search inputs was or were never submitted (e.g., by pressing "enter", for example), indicia of such search terms or computer-perceptible search inputs may, nevertheless, be stored in the association database 112 or otherwise used in subsequent searches for the same or similar content. Indeed, such deleted or entered but never submitted search terms or computer-perceptible search inputs may be the first thing the user thinks of when searching for this subject matter (even though he or she may later change his or her mind and decide not to submit these to the search engine) and, as such, may constitute an actionable (by the computing device) indication of the searched content.

As noted above, block B52 calls for the received input by the single user to be matched with one or more stored digital items based upon prior inputs by the single user that previously led the single user to access the digital item. Such matching may, according to one embodiment, may comprise determining the similarity between the received input from the user and the prior inputs received from the single user prior to a previous access thereto by the single user. The degree of such similarity may be determined according to any of a number of matching algorithms. Moreover, the threshold of similarity that would trigger the presentation of the digital items or items (e.g., a document, a file, movie, a picture, music, a website or location) in block B53 may be freely set, according to the implementation. According to one embodiment, the prior inputs (received from the single user prior to a previous access thereto by the single user) may be determined over a predetermined time period, or may span any time period during which a predetermined number of user inputs are received. For example, the user's behavior may be tracked after say, an unsuccessful search. If, for example, the user opened a particular file by navigating directly to the file via a file utility or a word processing application (for example) within a predetermined time period after an unsuccessful search, the association between the just-opened file and the previously received user inputs may be strengthened. This may then increase the likelihood that this file will be presented to the user in the future upon subsequent receipt of the same user inputs of the previously unsuccessful search. To track previous user inputs, association indicia of such prior inputs by the single user may be stored in the association database 112, or equivalent. As graphically illustrated in FIG. 2, a weight may be associated with each of the stored association indicia. This weight may, according to one embodiment, be increased upon the user accessing (e.g., opening, viewing) the presented digital item or items and decreased when the user does not access the presented digital item(s).

FIG. 6 is a flowchart of a method of accessing a digital item, according to one embodiment. As shown therein, the method may comprise initiating a search based upon receiving computer-perceptible search inputs from a single user, at least one of the computer-perceptible search inputs being unrelated to, for example, the name and/or content of the stored digital item that is the object of the search, as shown at B61. The computer-perceptible search input(s) may also be unrelated to, for example, the original metadata of the digital item being sought. Block B62 calls for determining the similarity of the received computer-perceptible search inputs with one or more previously-stored (in association database 112, for example) indicia of computer-perceptible search inputs that were received from the single user prior to the single user previously accessing the stored digital item. At B63, the stored digital item(s) may be presented to the single user when the determined similarity is greater than a predetermined threshold.

Advantageously, embodiments enable efficient searching of a user's NAS or other accessible storage based on the user's own subjective, personal associations or actions, even if such associations or actions bear no readily apparent relation (to other users, for example) to the object of the search. Indeed, how users find their data is often very personal. Embodiments do not force the user into some pre-conceived framework for searching his or her own personal data on his or her NAS or other network-accessible storage. Such personalized searches may be faster than searching in the conventional manner and may encourage sharing of personal pictures, movies with others.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

What is claimed is:

1. A computing device, comprising:
   a memory; and
   a processor coupled to the memory, the processor being configured to execute instructions stored in the memory to:
   receive an input from a user, the received input comprising a search term; and
   associate a search result comprising a digital item with the received input based at least partly on:
   the received input;

prior accesses of the digital item based upon prior inputs of search terms by the user; and prior associations of the search terms of the prior inputs with prior search results comprising the digital item, wherein at least some of the search terms of the prior inputs are unrelated to a name, original metadata, and content of the digital item and have previously led the user to find and access the digital item.

2. The computing device of claim 1, wherein search results are personal to the user such that another user using the same search term would be presented with a different digital item.

3. The computing device of claim 1, wherein the search term was entered but subsequently deleted prior to submission.

4. The computing device of claim 1, the processor further configured to:

associate the search term with the digital item by determining a similarity between the received input and the prior inputs received from the user prior to a previous access of the digital item by the user.

5. The computing device of claim 1, wherein the received input and the prior inputs further comprise computer-perceptible user actions.

6. The computing device of claim 5, wherein the computer-perceptible user actions comprise at least one of text input, voice input, gestural input, and machine vision input.

7. The computing device of claim 1, wherein the digital item comprises at least one of a document, a file, a movie, a picture, a website, music, and a location.

8. The computing device of claim 1, wherein the prior inputs are determined over a predetermined time period.

9. The computing device of claim 1, wherein the processor is further configured to store association indicia of the prior inputs.

10. The computing device of claim 9, wherein the processor is further configured to associate a weight with each of the stored association indicia, the weight being increased responsive to determining that the user accesses the digital item and decreased responsive to determining that the user does not access the digital item.

11. A computer-implemented method, comprising:

receiving an input from a user, the received input comprising a search term; and associating a digital item with the received input based at least partly on:

the received input;

prior accesses of the digital item based upon prior inputs of search terms by the user; and prior associations of the search terms of the prior inputs with prior search results comprising the digital item, wherein at least some of the search terms of the prior inputs are unrelated to a name, original metadata and content of the digital item and have previously led the user to find and access the digital item.

12. The computer-implemented method of claim 11, wherein search results are personal to the user such that another user using the same search term would be presented with a different digital item.

13. The computer-implemented method of claim 11, wherein the search term was entered but subsequently deleted prior to submission.

14. The computer-implemented method of claim 11, further comprising:

associating the search term with the digital item by determining a similarity between the received input and the prior inputs received from the user prior to a previous access of the digital item by the user.

15. The computer-implemented method of claim 11, wherein the received input and the prior inputs further comprise computer-perceptible user actions.

16. The computer-implemented method of claim 15, wherein the computer-perceptible user actions comprise at least one of text input, voice input, gestural input, and machine vision input.

17. The computer-implemented method of claim 11, wherein the digital item comprises at least one of a document, a file, a movie, a picture, a website, music, and a location.

18. The computer-implemented method of claim 11, wherein the prior inputs are determined over a predetermined time period.

19. The computer-implemented method of claim 11, further comprising storing association indicia of the prior inputs.

20. The computer-implemented method of claim 19, further comprising associating a weight with each of the stored association indicia, the weight being increased responsive to determining that the user accesses the digital item and decreased responsive to determining that the user does not access the digital item.

21. A computing device, comprising:

a memory means; and a processing means coupled to the memory means, the processing means being configured to execute instructions stored in the memory means to:

receive an input from a user, the received input comprising a search term; and associate a digital item in a data storage with the received input based at least partly on:

the received input;

prior accesses of the digital item stored on the data storage based upon prior inputs of search terms by the user; and prior associations of the search terms of the prior inputs with prior search results comprising the digital item, wherein at least some of the search terms of the prior inputs are unrelated to a name, original metadata and content of the digital item and have previously led the user to find and access the digital item.

\* \* \* \* \*